Figure 1:
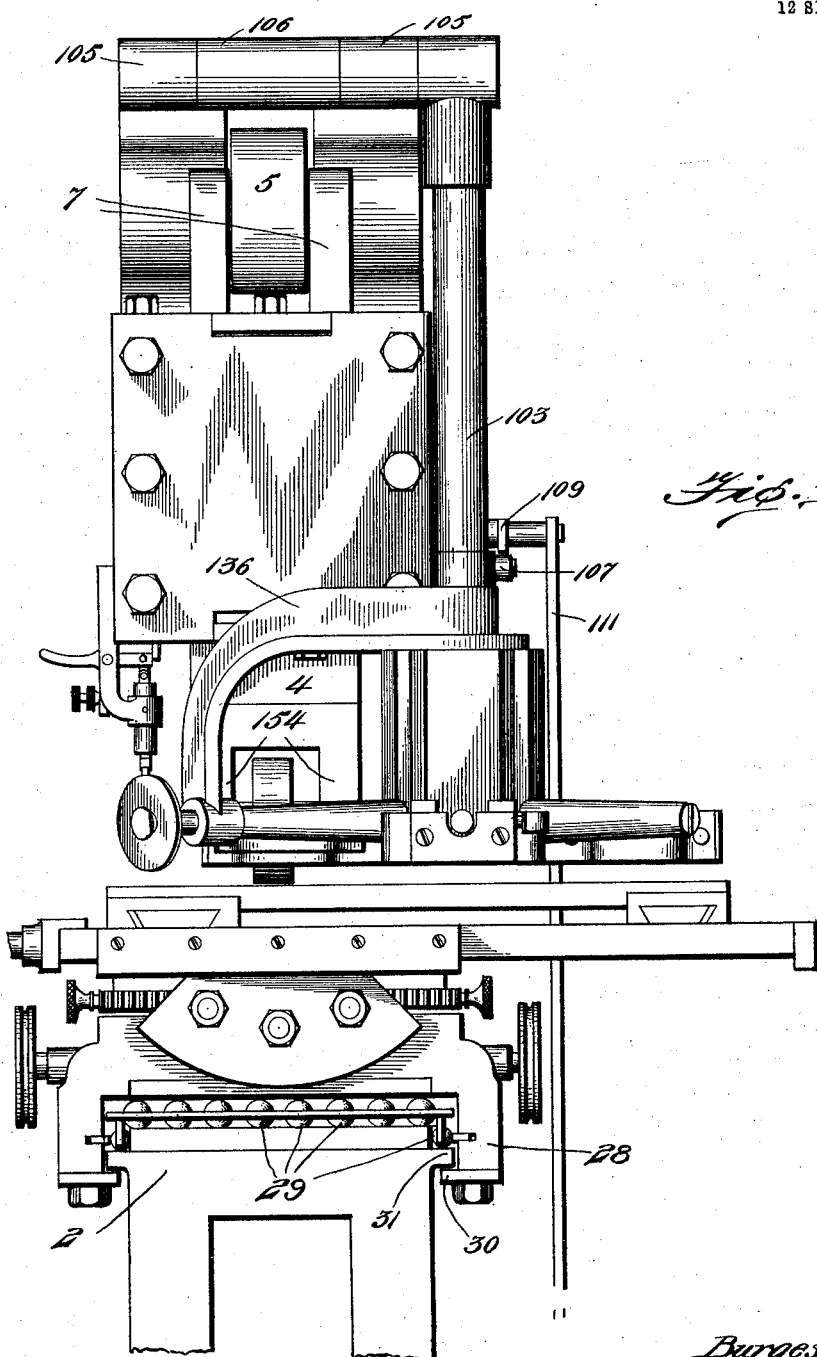

B. W. SMITH.
TRANSFER PRESS.
APPLICATION FILED OCT. 14, 1909. RENEWED OCT. 7, 1911.

1,025,165.

Patented May 7, 1912.

12 SHEETS—SHEET 1.

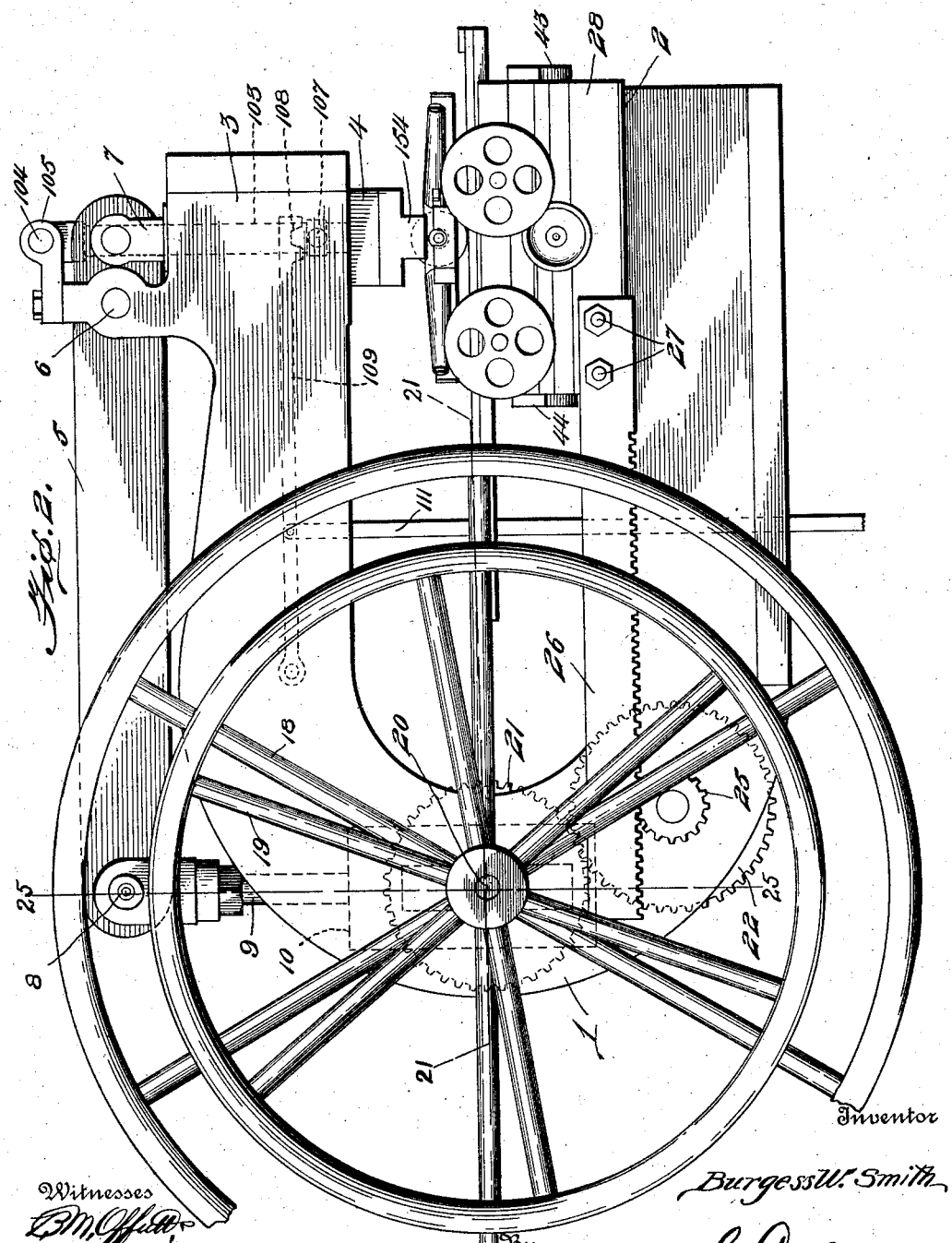

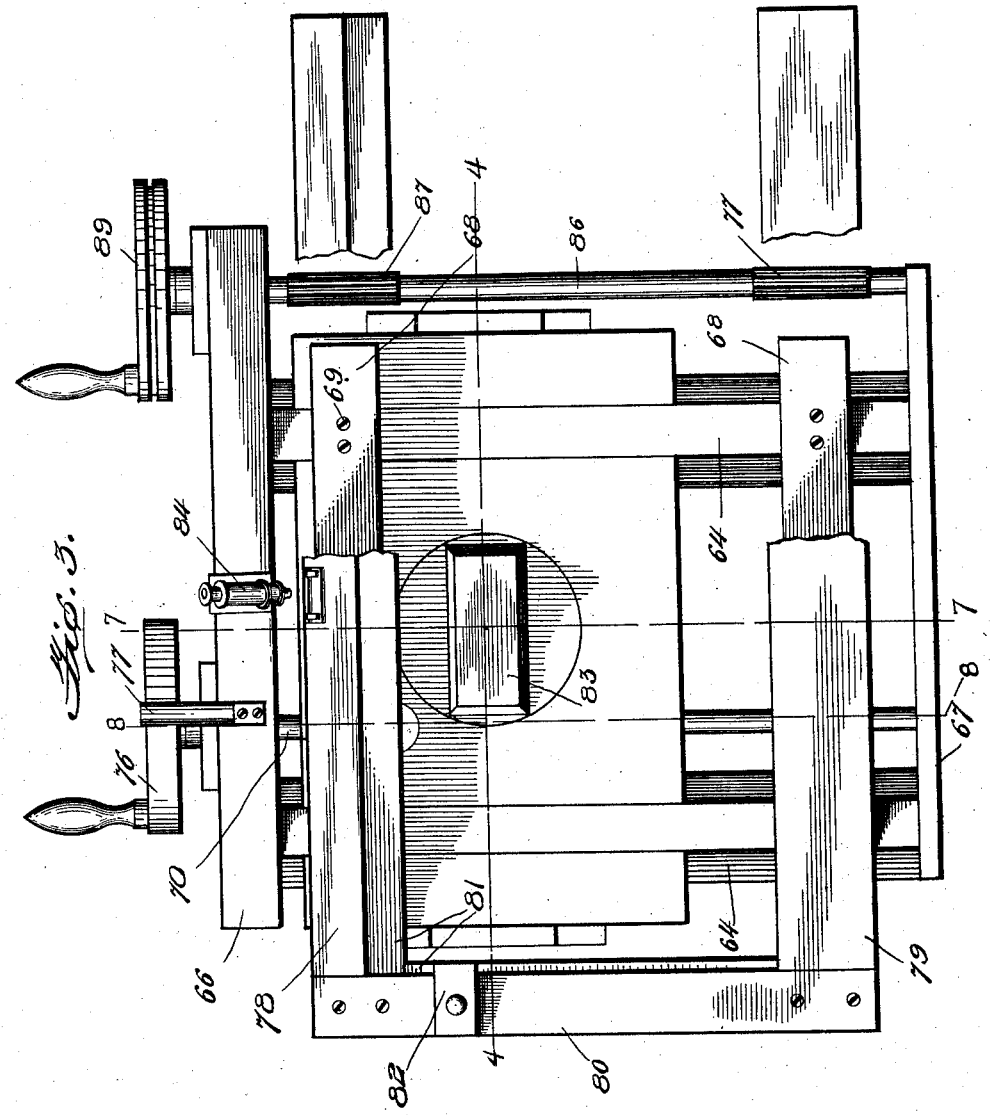

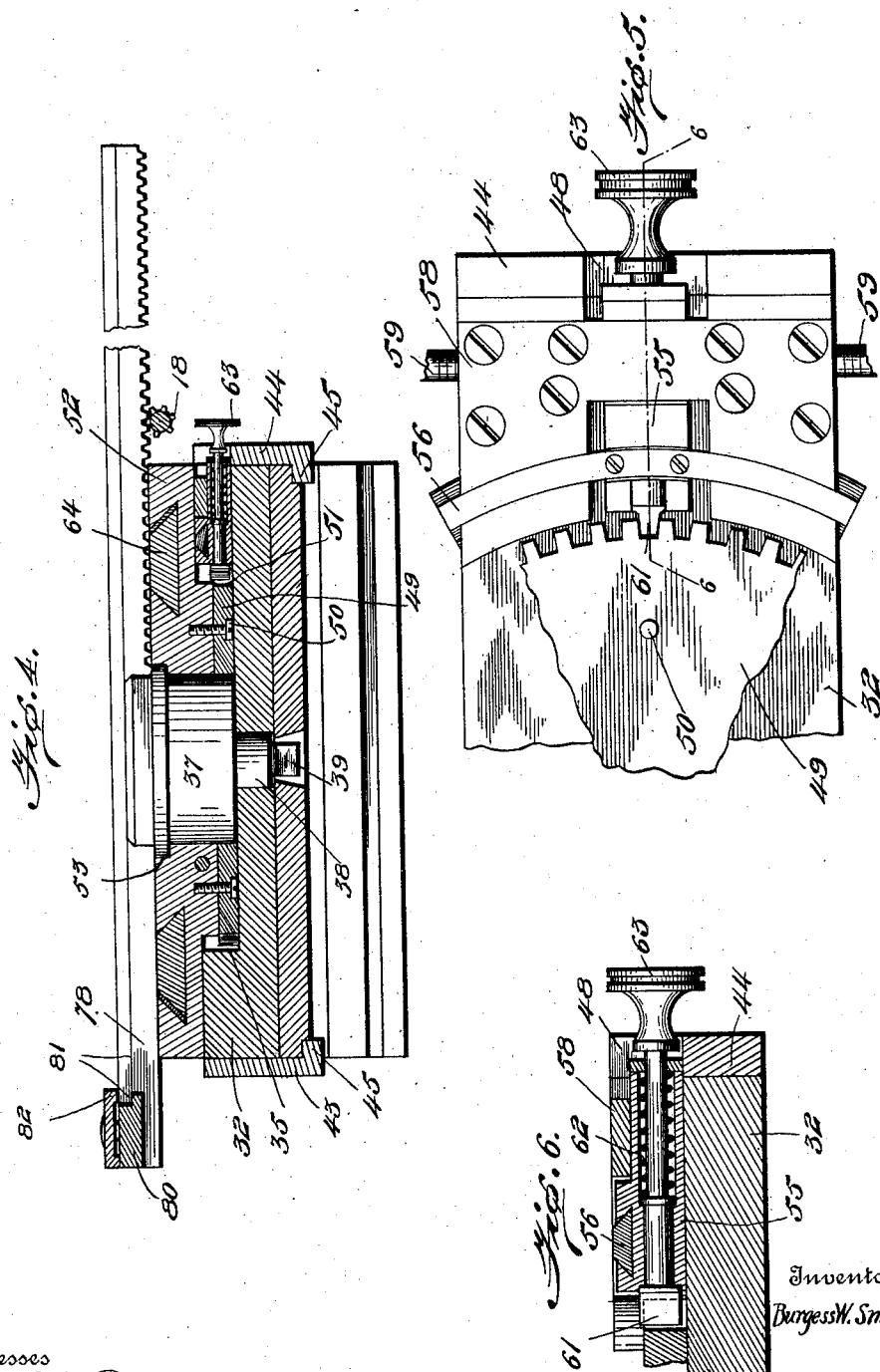

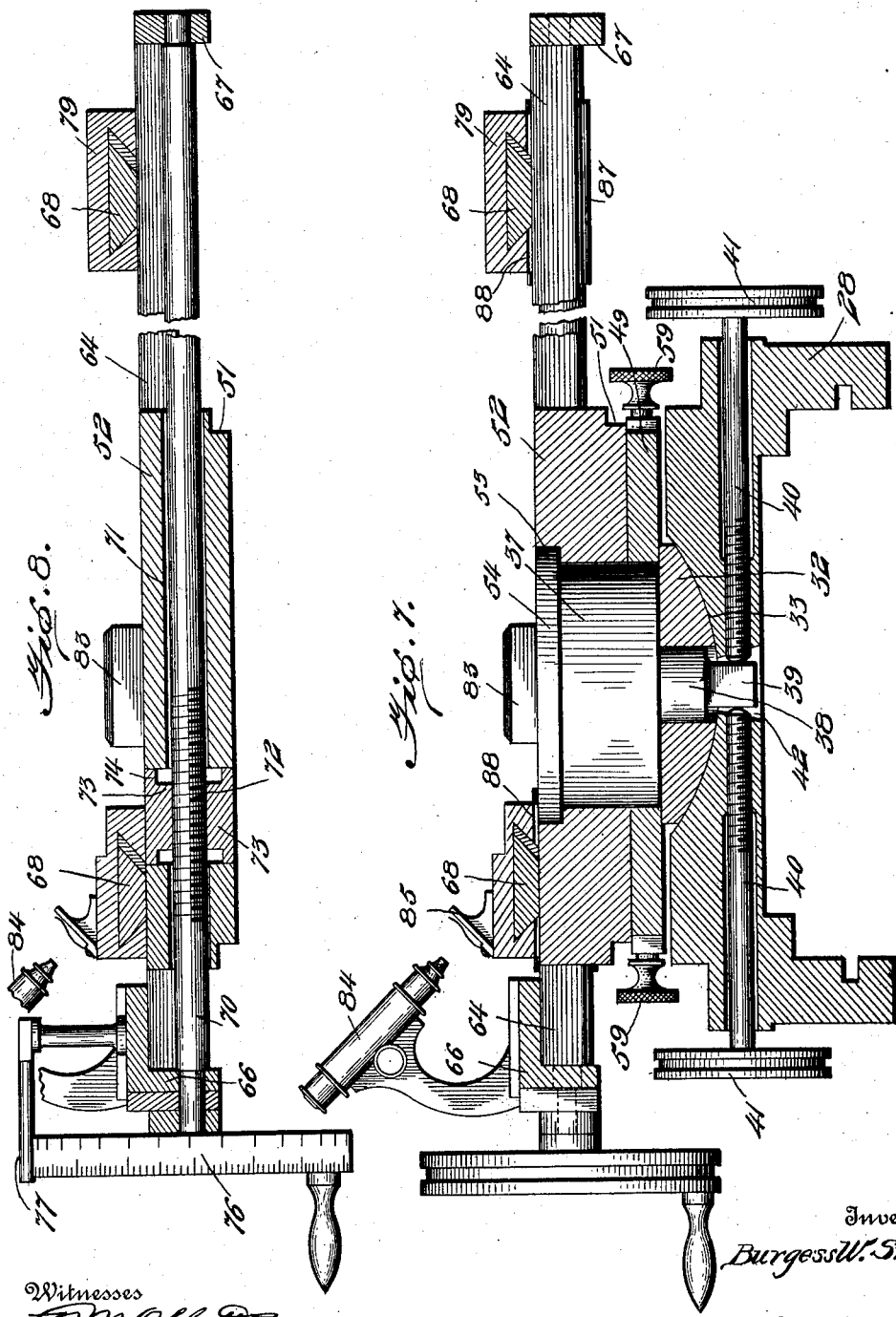

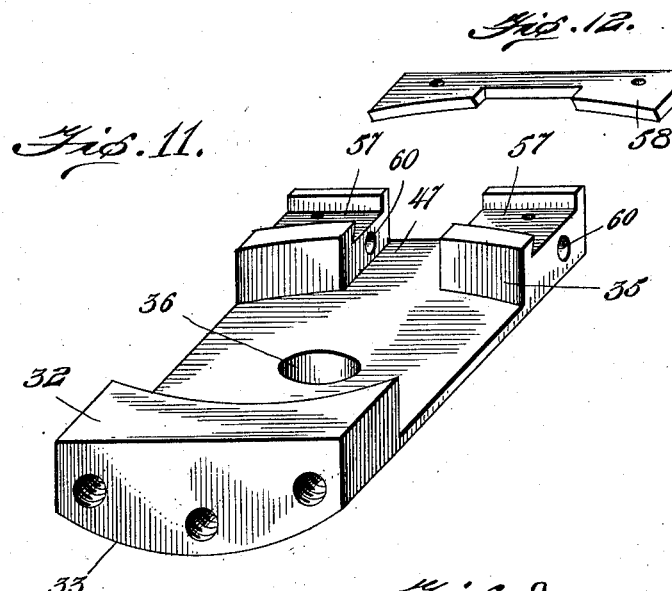

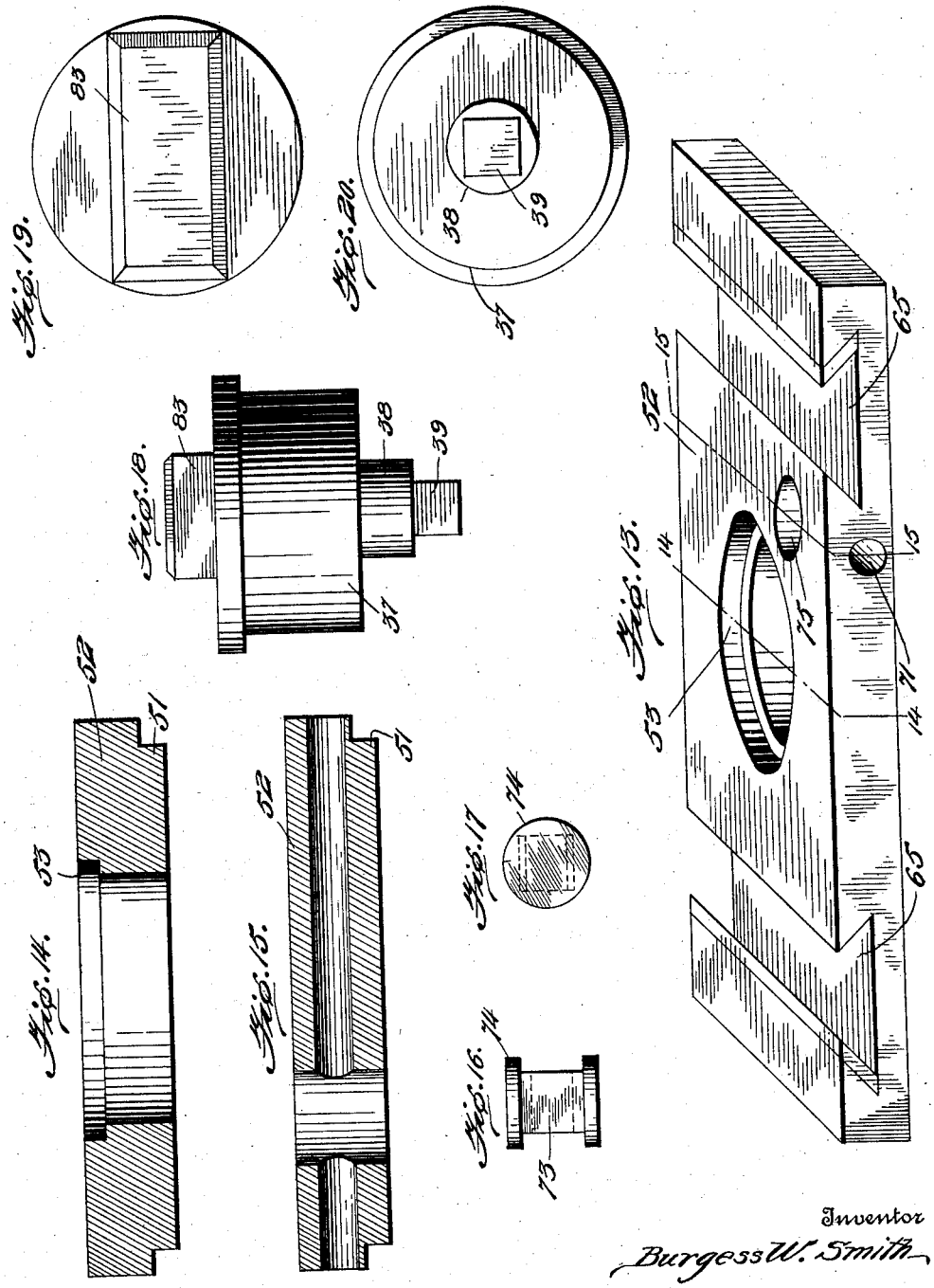

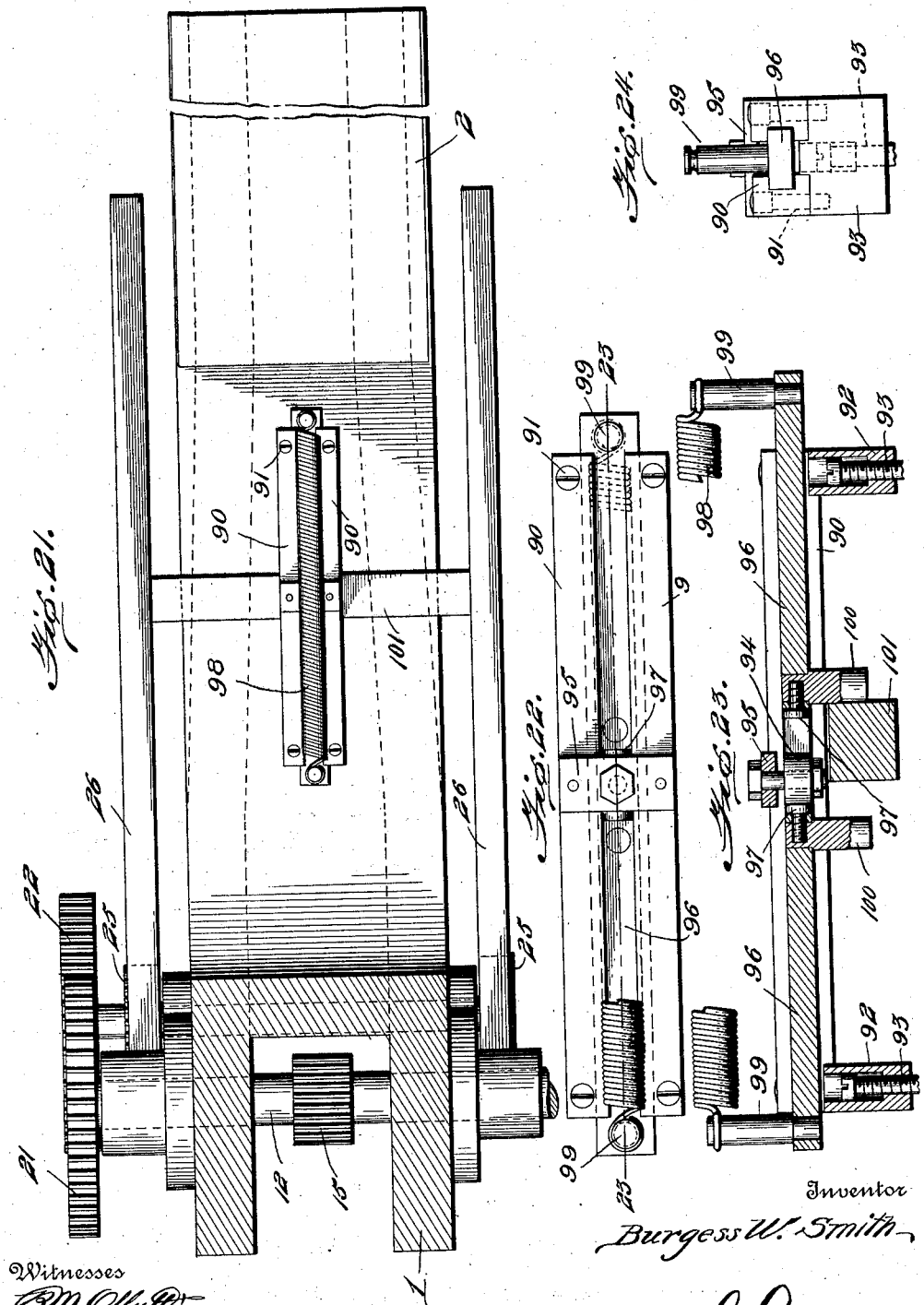

B. W. SMITH.
TRANSFER PRESS.
APPLICATION FILED OCT. 14, 1909. RENEWED OCT. 7, 1911.
1,025,165.
Patented May 7, 1912.
12 SHEETS—SHEET 9.
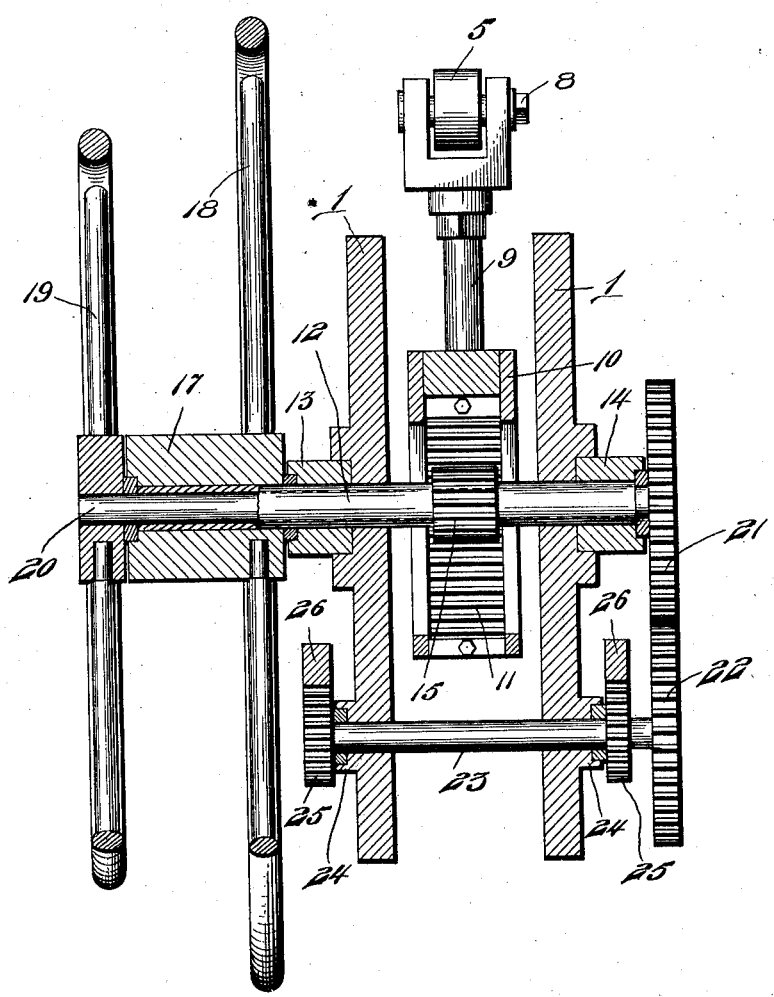
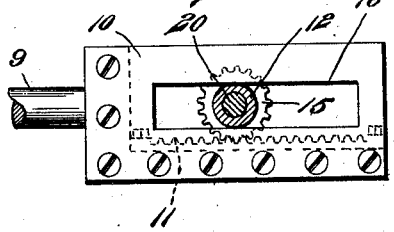

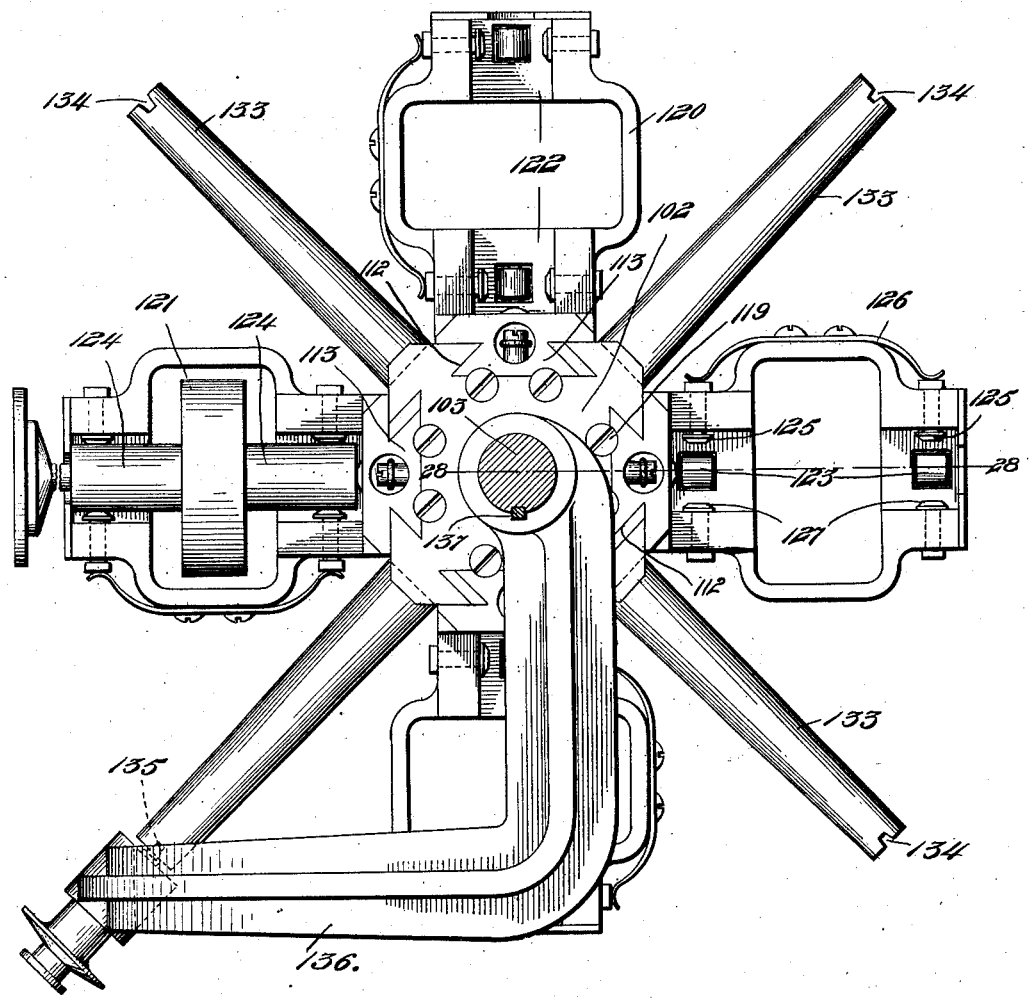

B. W. SMITH.
TRANSFER PRESS.
APPLICATION FILED OCT. 14, 1909. RENEWED OCT. 7, 1911.
1,025,165.
Patented May 7, 1912.
12 SHEETS—SHEET 11.
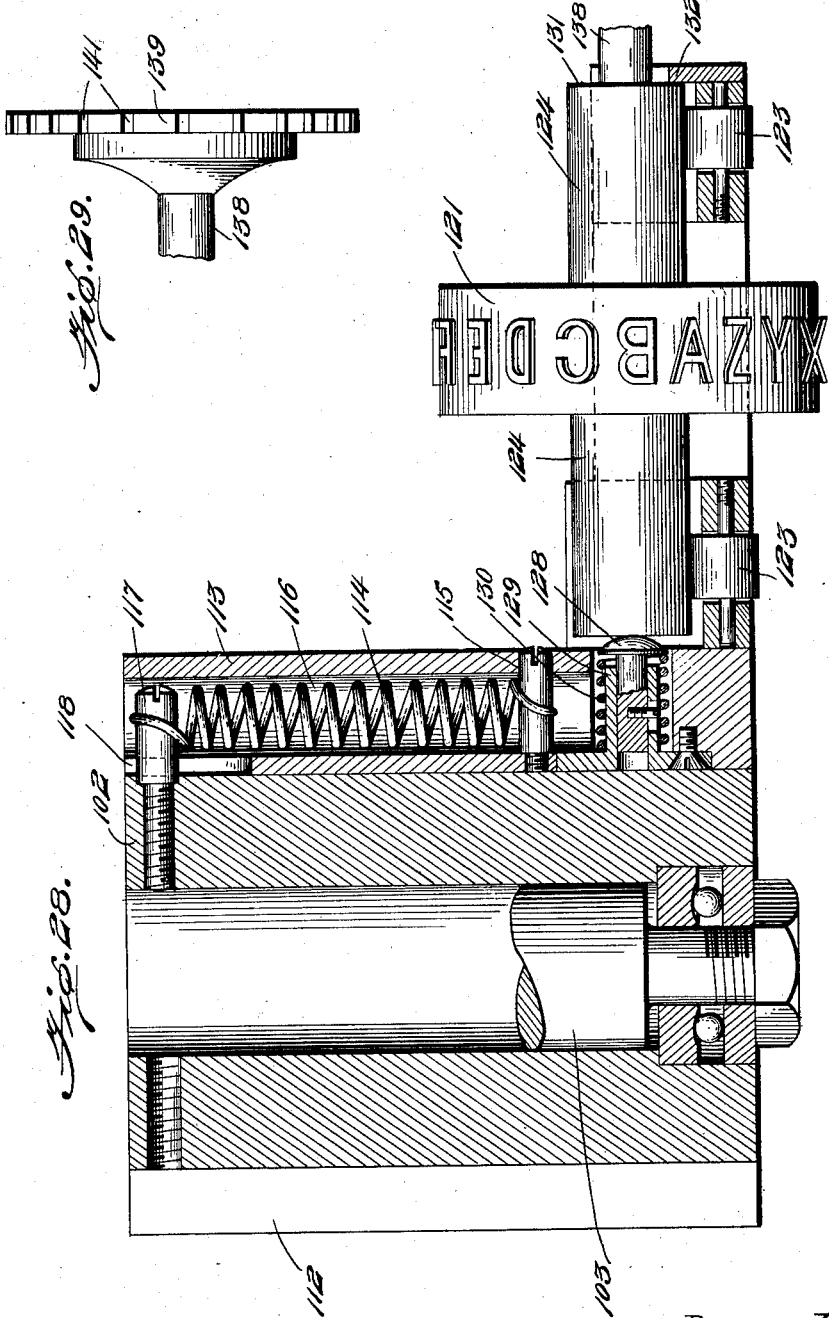
Witnesses
B. M. Offutt
G. H. Ayres.
Inventor
Burgess W. Smith
By
G. Ayres
Attorney B. W. SMITH.
TRANSFER PRESS.
APPLICATION FILED OCT. 14, 1909. RENEWED OCT. 7, 1911.
1,025,165.
Patented May 7, 1912.
12 SHEETS—SHEET 12.
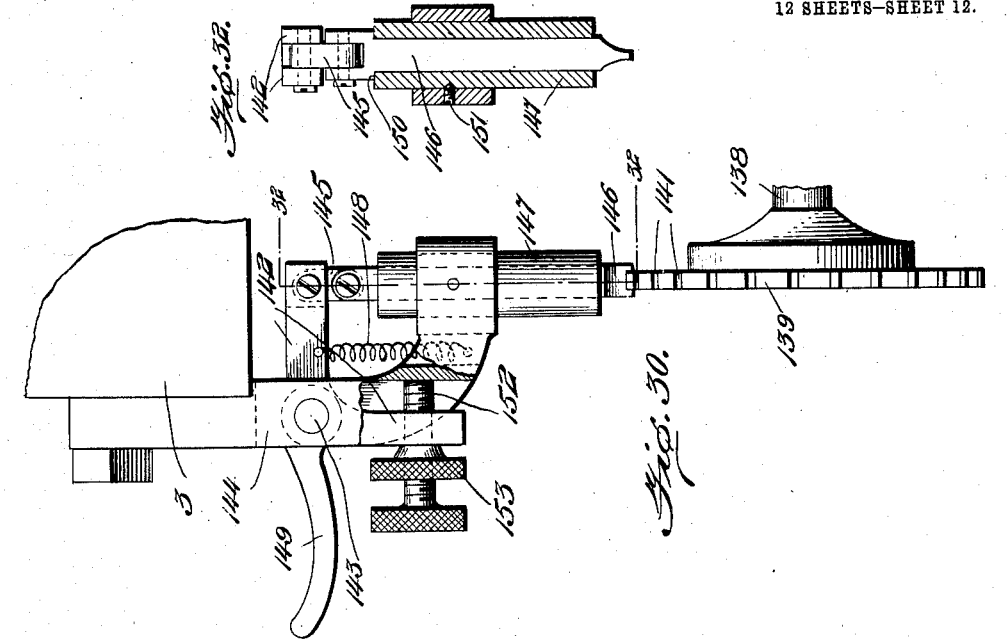
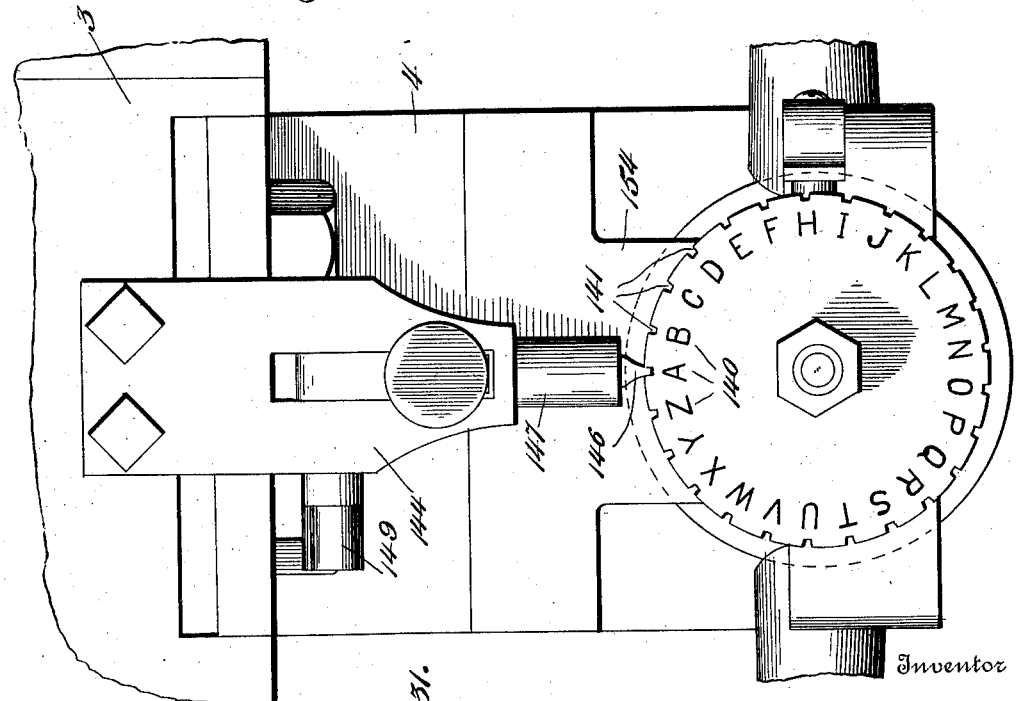

UNITED STATES PATENT OFFICE.

BURGESS W. SMITH, OF WASHINGTON, DISTRICT OF COLUMBIA, ASSIGNOR TO JOHN R. HILL, OF WASHINGTON, DISTRICT OF COLUMBIA.

TRANSFER-PRESS.

1,025,165.      Specification of Letters Patent.      Patented May 7, 1912.

Application filed October 14, 1909, Serial No. 522,578. Renewed October 7, 1911. Serial No. 653,398.

*To all whom it may concern:*

Be it known that I, BURGESS W. SMITH, a citizen of the United States, residing at Washington, in the District of Columbia, have invented certain new and useful Improvements in Transfer-Presses, of which the following is a specification.

My invention relates to improvements in transfer presses, and it consists in the constructions, combinations and arrangements herein described and claimed.

An object of my invention is to provide improved means for producing printing-plates by the transfer process, thereby obviating the necessity of engraving an initial plate and preparing a special transfer-roll for each different arrangement of the characters or letters.

A further object of my invention is to provide improved means by which designs and characters can be impressed in printing-plates with greater clearness and sharpness than has been heretofore possible.

A further object of my invention is to provide improved means constructed to accurately produce all desired combinations and spacings of the different characters or designs impressed in a printing-plate by a transfer-roll, and provided with devices for automatically insuring accuracy on the part of the operator.

A further object of my invention is to provide an improved transfer-press constructed to impart to the operator, through the "feel" or touch of the latter, a constant knowledge of the manner in which the several steps of the operation are being performed, such as the amount and uniformity of the impressing and rolling forces.

In the accompanying drawings, forming a part of this application, and in which similar reference symbols indicate corresponding parts in the several views:

Figure 1 is a right-hand end elevation, illustrating one embodiment of my invention; Fig. 2 is a front side elevation of the construction shown in Fig. 1, with parts omitted for clearness; Fig. 3 is a plan view, on a larger scale, of the carriage for supporting and properly positioning, for receiving the impressions, a secondary surface, such as a printing plate; Fig. 4 is a section on the line 4—4 of Fig. 3; Fig. 5 is a fragmentary plan view of the rocking base with an annular index and adjusting stop mounted thereon; Fig. 6 is a section on the line 6—6 of Fig. 5; Fig. 7 is a section, on a larger scale, along the line 7—7 of Fig. 3; Fig. 8 is a section on the line 8—8 of Fig. 3, with all parts below the rotating block omitted; Fig. 9 is a perspective view of the traveling bed; Fig. 10 is a similar view of a guide plate for fitting the front of the bed; Fig. 11 is a perspective view of the rocking base; Fig. 12 is a similar view of a retaining guide for the base; Fig. 13 is a perspective view of the rotating block; Fig. 14 is a section on the line 14—14 of Fig. 13; Fig. 15 is a section on the line 15—15 of Fig. 13; Fig. 16 is a side elevation of a nut adapted to be loosely supported within the rotating block; Fig. 17 is a plan view of said nut; Fig. 18 is a side elevation of a central trunnion for the several parts of the carriage; Fig. 19 is a top plan view of said trunnion; Fig. 20 is a bottom plan view of said trunnion; Fig. 21 is a section on the line 21—21 of Fig. 2, on a larger scale, with the carriage removed for clearness; Fig. 22 is a plan view, on a larger scale, of the means for normally maintaining the carriage in its central position; Fig. 23 is a section on the line 23—23 of Fig. 24; Fig. 24 is an end elevation of the construction shown in Fig. 22; Fig. 25 is a section on the line 25—25 of Fig. 2; Fig. 26 is a fragmentary side elevation of the vertical rack and pinion shown in Fig. 25; Fig. 27 is a plan view, on a larger scale, of the multiple roll carrier and its locking means; Fig. 28 is a section, on a larger scale, taken on the line 28—28 of Fig. 27; Fig. 29 is an edge view of the notched index disk secured to the roll mandrel; Fig. 30 is an enlarged fragmentary view of the roll-locking devices shown at the left in Fig. 1; Fig. 31 is a left-hand elevation of the parts shown in Fig. 30, and Fig. 32 is a section on the line 32—32 of Fig. 30.

As shown especially in Figs. 1, 2, 21, 25, 30 and 31 of the drawings, my invention embodies a preferably U-shaped frame 1, provided with ways 2 for a carriage and a head 3 for a reciprocating plunger 4. A lever 5 is shown pivoted at 6 on the frame 1, with its right-hand end connected by links 7 to said plunger 4; the left-hand end of said lever being pivotally connected at 8 to a rod 9 rigidly secured to a box 10 provided with a rack 11. A hollow shaft 12 is journaled in suitable bearings 13 and 14 on the frame 1, and carries a pinion 15 meshing with said rack 11; the box 10 being provided with slots 16 slidably embracing the hollow shaft 12 for guiding said box in its vertical movement. The hub 17 of a hand wheel 18 is rigidly secured, as by a forced fit, to said hollow shaft 12, for operating said shaft to reciprocate the rack box 10; thereby providing efficient means for oscillating the lever 5 to operate the plunger 4. A hand wheel 19, preferably formed for convenience of somewhat less diameter than the wheel 18, is secured to a shaft 20 concentrically mounted within the hollow shaft 12. A gear 21 is secured to the rear end of said inner shaft 20 in mesh with a gear 22 on a counter shaft 23 journaled at 24 on the frame 1 and carrying two pinions 25, which latter mesh with rack bars 26 on opposite sides of said frame. The rack bars 26 are secured, as by bolts 27, to the traveling bed 28 of a carriage; said bed being mounted on suitable ball bearings 29 on the ways 2 and provided with retaining plates 30 extending beneath the projecting sides 31 of said ways. A rocking base 32 is formed with an arc-shaped face 33 for fitting a similarly formed recess 34 in the traveling bed 28, and recessed at 35 on its upper surface concentrically with a cylindrical opening 36, which latter registers with an opening 42 in the traveling bed. A central trunnion 37 is seated on the bottom of such recess 35 in said base, and provided with a reduced lower portion 38 extending through said opening 36 and terminating below said rocking base 32 in a hub 39 extending within the recess 42 for engagement by a pair of opposed screws 40 threaded in the bed 28 and provided with hand wheels 41; said screws constituting an efficient self-locking mechanism for accurately rocking said base on the traveling bed. Retaining plates 43 and 44 are secured, respectively, to the two ends of said rocking base 32, and provided with arc-shaped projections 45 slidably fitting within corresponding recesses 46 in the ends of the traveling bed; the left-hand end of the base 32 and the retaining plate 44 secured thereto are recessed at 47 and 48 flush with the bottom of the recess 35 in said base.

An annular spur wheel, or index, 49 is rotatively mounted on the trunnion 37 within the recess 35 in said rocking base, and secured, as by screws 50, to a cylindrical boss 51 on the bottom of a block 52, which latter is rotatively mounted on the trunnion 37 and provided with an upper recess 53 for receiving an annular shoulder 54 on said trunnion.

A box 55 is positioned in the recess 47 of the rocking base and carries a dovetailed slide 56, which is curved concentrically with the index wheel 49 and slidably retained in a recess 57 in said rocking base by a retaining plate 58; a pair of opposed thumb screws 59 being threaded in openings 60 in the rocking base for engaging said box 55 to accurately adjust, or shift, the latter along the path of its attached slide 56. A stop 61 extends slidably through the box 55 and is normally maintained in yielding engagement with the index wheel 49 by a spring 62; said stop constituting efficient means for accurately shifting said index wheel and its attached rotatable block 52 upon adjustment of the thumb screw 59, and being provided with a head 63 for retracting said stop against the tension of the spring 62 to release the index wheel 49 for permitting a rough, or approximate, adjustment of said wheel and rotatable block 52.

A pair of transverse slides 64 are slidably mounted in undercut grooves 65 in the rotatable block 52, and rigidly connected at their front and rear ends, respectively, by an angle plate 66 and by a bar 67; undercut guides 68 are rigidly secured perpendicularly across the upper faces of said transverse slides, as by screws 69. A shaft 70 is journaled in the end connections 66 and 67 of the transverse slides and extends loosely through an opening 71 in the rotatable block 52; said shaft being threaded at 72 for engaging a nut 73, which latter is provided with disk-shaped heads 74 fitting an opening 75 in said rotatable block. The threaded shaft 70 is provided with a graduated hand wheel 76 in coöperative relation to an index 77 carried by the angle plate 66 in which said threaded shaft is journaled; the whole constituting a very convenient and efficient self-locking mechanism for accurately adjusting said transverse slides on the rotatable block 52.

A pair of longitudinal slides 78 and 79, constituting supports for a secondary surface, such as a printing-plate, are slidably mounted on the undercut guides 68 secured across the upper faces of the transverse slides 64; the right-hand ends of said longitudinal slides 78 and 79 being rigidly connected by a cross bar 80. The slide 78 and connecting bar 80 are shown recessed at 81 for receiving the printing-plate to be operated upon, and suitable clamps 82 are secured to said cross bar 80 for rigidly clamping such printing-plate in position. As shown especially in Figs. 7 and 8, the bottoms of the work-receiving recesses 81 lie in a common plane with the top surface of an anvil 83 extending upwardly from the central trunnion 37; whereby said anvil will constitute a rest for supporting that portion of a printing-plate at a point immediately beneath the transfer-roll, to be hereafter described, in all shifted positions of the plate. A suitable sighting device, such as a microscope 84 provided with the usual hair line for accurate reading, is mounted on the angle plate 66 of the transverse slides in coöperative relation with a pattern support 85 carried by the longitudinal slide 78. In the employment of the sighting device 84, a pattern is prepared showing to exact scale the arrangement and relative positions of the several characters which it is desired to successively impress into a printing-plate, and such pattern is clamped to the support 85 in position to bring the first character position thereof in registry with the hair line of the microscope 84 when the printing-plate is properly positioned for receiving impression of the initial character desired. After completion of such initial impression in the printing-plate the longitudinal slides 78 and 79 are shifted until the second character position indicated in the pattern on the support 85 is brought into registry of the hair line of the microscope 84, the second character is then impressed and the above steps repeated until completion of the required printing-plate. A shaft 86 is journaled in the end connections 66 and 67 of the transverse slides 64, and carries pinions 87 which mesh with rack teeth 88 formed on the lower faces of the longitudinal slides 78 and 79; said shaft 86 being provided with a hand wheel 89 for rotating it to shift the longitudinal slides in the above described operation.

A pair of U-shaped guides 90 are shown secured by bolts 91 to end plates 92, which latter are rigidly secured to the main frame by bolts 93. A preferably cylindrical central stop 94 is rigidly secured to a plate 95 attached across the upper faces of the guides 90 in position for limiting the inward travel of a pair of independent slides 96 mounted in the respective ends of said guides; said slides being provided with adjustable bearing faces, such as flat-headed screws 97, for engaging the central stop 94.

A spring 98 is attached to pins 99 on said slides 96 for yieldingly maintaining the latter in their normal central position against the stop 94. The slides 96 are provided with dependent lugs 100 for engaging the opposite sides of a cross bar 101 extending between the rack bars 26 for shifting the work-supporting carriage; thereby providing means for automatically returning said carriage to its central position upon the operator's release of the hand wheel 19 after completing the impression of a character in the printing plate supported on said carriage. This insures the carriage being normally maintained in its central position, with the anvil 83 immediately beneath the transfer-roll for solidly supporting that portion of a printing plate in which a character is being impressed. As shown especially in Figs. 4 and 7, the trunnion 37 which supports the anvil 83 is constructed to rest upon, and transmit all pressure upon said anvil, to the rocking base 32; thereby avoiding all strain and unnecessary friction on the rotating block 52 and the slides supported thereon.

A multiple roll carrier 102 is rotatably carried on the lower end of a swing arm 103, pendant from a shaft 104 journaled in bearing 105 on the main frame; a sleeve 106 being shown secured to said shaft between the bearings 105 for preventing axial shifting of the former. The swing arm 103 carries a roller 107 in position for engagement by the converging walls of a tapered recess 108 in a lever 109 pivoted to the main frame at 110. A rod 111 operatively connects the lever 109 to any usual form of spring pedal, which latter acts to normally maintain said lever raised with its recess 108 out of engagement with the roller 107.

The roll carrier 102 is provided with a series of under cut guides 112 for receiving a corresponding series of slides 113. A spring 114 is attached at its lower end to a pin 115 within a bore 116 in each slide 113; the upper ends of the several springs being attached to pins 117 secured to the carrier 102 and extending through slots 118 in said slides. This provides resilient means for yieldingly maintaining the several slides in their upward positions against stop screws 119 on the carrier 102.

The several slides 113 carry roll cradles 120, which latter are provided with intermediate open body portions for receiving a roll 121 and with recessed end portions 122 provided with base rollers 123 for supporting the roll mandrel 124. Adjustable stops 125 in the respective ends of each roll cradle are engaged by a spring 126 for yieldingly maintaining the roll mandrel against fixed stops 127 in said recessed ends; thereby insuring accurate lateral positioning of the roll in its cradle.

A stop 128, slidably mounted in a sleeve 129 on each slide 113, is maintained by a spring 130 against the inner end of the corresponding roll mandrel, for maintaining a shoulder 131 at the outer end of said mandrel against a stop plate 132 secured to the cradle and thereby automatically insuring an accurate axial adjustment of the roller.

A plurality of arms 133 extend from the roll carrier 102 intermediate of the several cradles 120, and are provided with notched ends 134 for engagement by a spring detent 135 carried at the lower end of a bent arm 136, which latter is rigidly secured, as by a key 137, to the swing arm 103; thereby providing efficient means for properly locking the roll carrier 102 on the swing arm with any of the several rollers in operative position, and for maintaining said carrier lock during swing of the arm in the rolling operations.

A transfer-roll 121 is provided on its periphery with any desired series of letters or characters in relief, and carries on the reduced outer end 138 of its mandrel an index disk 139 provided with series of index marks 140 and notches 141 corresponding in position and arrangement with the peripheral series of relief character.

An L-shaped arm 142 is pivoted at 143 in a bracket 144 secured to the head 3 of the main frame, and connected by a link 145 to the stop 146, slidably mounted in a support 147 on said bracket for engaging the several notches 141 in the index disk of the particular roll which is locked in operative position beneath the mandrel ways 154 on the head 4.

A spring 148 is provided for normally maintaining the stop 146 in its lower position for engaging the index wheel, and a handle 149 is secured to the pivot 143 for raising said stop to release said wheel. The stop 146 is provided with a head 150 for engaging the support 147 to limit its downward movement; the support being adjustably mounted in the bracket 144, as by a set screw 151, for regulating the lowest position of said stop. Upward movement of the stop 146 is limited by a screw 152, provided with a lock nut 153, and adjustably threaded in one branch of the L-shaped arm 142 for engaging the bracket 144.

In the operation of my invention, the roll carrier 102 is locked to operatively position a roll, which comprises the primary surface, beneath the mandrel ways 154 on the plunger head 4. The roll is then rotated on its cradle and locked by the stop 146 to operatively position the desired character for impression in a secondary surface. A suitable secondary surface, such as a steel printing-plate, is clamped in the recess 81 of the supporting slides 78—79, and such slides adjusted by the hand wheel 89 to bring the desired portion of the plate on the anvil and beneath the roll, for receiving impression of the initial character. A pattern, having the required arrangement and relative positions of the several characters indicated thereon to exact scale, is clamped to the support 85 in position to bring the initial character position thereon in registry with the hair line of the microscope 85. The operator depresses the pedal-controlled lever 109 to center the swing arm 103, and turns the hand wheel 18 to depress the head 4 sufficiently to impress the initial character of the roll into the printing-plate. In this operation, the mandrel ways 154 on the head 4 engage the roll mandrel and force the roll cradle and its supporting slide downward against the tension of the spring 114 sufficiently to fully impress the initial character into the printing-plate, and to simultaneously shift the index disk 139 from engagement by the stop 146. The operator, while still retaining his grip on the hand wheel 18, then slightly oscillates the hand wheel 19 to produce a short reciprocation of the work-supporting carriage for rolling the impressed character in the printing-plate. In this rolling operation, the arm 103 is free to swing about its supporting shaft 104, and the roll is supported for free rotation in the cradle 120 slidably mounted on said swing arm; thereby providing a very advantageous construction for insuring a sharper and more accurate impression than has been possible in previous construction. It will be understood that during such impressing and rolling operation, the extent and uniformity of the impressing and rolling forces will be accurately indicated to the operator by the "feel" of touch imparted through the latter's grip on the concentric hand wheels 18 and 19; and thereby placing the entire process under the intelligent control of the operator, and enabling him to accurately regulate the operation throughout. After thus completing an impression of the initial character, the operator turns the hand wheel 18 to raise the head 4 and the mandrel ways 154 carried thereby; whereupon the spring 114 will elevate the slide and roll cradle to raise the roll from engagement with the printing-plate. Upon such release of the roll from the printing-plate, the spring 98 will automatically shift the work-supporting carriage to its normal central position. The operator then turns the hand wheel 89 to shift the supporting slides 78 and 79 sufficiently to bring the second character position on the pattern in registry with the hair line of the microscope 84; thereby bringing the desired portion of the plate for receiving the second character over the anvil 83 and beneath the roll. The operator then properly positions the required roll with its desired character in operative position for impression into the printing-plate, in the manner above described, and successively operates the hand wheels 18 and 19 to impress and roll such second character into the printing-plate. The above steps are then repeated until the required series of characters or designs have been successively impressed in the secondary surface in their desired arrangement and spacing.

I have illustrated and described preferred and satisfactory constructions, but changes could be made within the spirit and scope of my invention.

Having thus described my invention, what I claim as new and desire to secure by Letters-Patent is:

1. In an apparatus of the character described, the combination of a primary surface provided with a series of characters, a support for a secondary surface, means for impressing the desired characters in the secondary surface, a movable bed carrying said support, and yielding means for normally maintaining said bed in central position, substantially as described.

2. In an apparatus of the character described, the combination of a primary surface provided with a series of characters, a support for a secondary surface, means for impressing the desired characters in the secondary surface, a movable bed carrying said support, means for adjusting said support on said bed to produce the required arrangement of such impressions in the secondary surface, and yielding means for normally maintaining said bed in central position, substantially as described.

3. In an apparatus of the character described, the combination of a primary surface provided with a series of characters, a support for a secondary surface, a movable bed carrying said support, means for moving said bed, and means for automatically returning said bed to its normal central position, substantially as described.

4. In an apparatus of the character described, the combination of a primary surface provided with a series of characters, a support for a secondary surface, a movable bed carrying said support, means for impressing the desired characters in the secondary surface, means for moving said bed during such impression, and means for returning said bed automatically to its normal position upon completion of such impression, substantially as described.

5. In an apparatus of the character described, the combination of a swinging support, a primary surface adjustably mounted in said support and provided with a series of characters, a support for a secondary surface, means for impressing the desired characters in the secondary surface, and means for shifting said swinging support accurately to its central position, substantially as described.

6. In an apparatus of the character described, the combination of a multiple carrier, a plurality of primary surfaces adjustably mounted thereon and provided with series of characters, a support for a secondary surface, means for locking said carrier to position any of said primary surfaces for impression in the secondary surface, and means for locking such positioned primary surface with any desired character thereof in operative position, substantially as described.

7. In an apparatus of the character described, the combination of a rotatable carrier, a plurality of primary surfaces adjustably mounted thereon and provided with a series of characters, means for locking said carrier in its several positions, and means for locking said adjustably mounted primary surfaces, substantially as described.

8. In an apparatus of the character described, the combination of a shiftable support for a primary surface, a primary surface mounted therein, a movable support for a secondary surface, means for impressing said primary surface in the secondary surface, and means for automatically returning said shiftable and movable supports to their normal central position after completion of such impression, substantially as described.

9. In an apparatus of the character described, the combination of a primary surface, a support for a secondary surface, a pair of concentric shafts, and connections from said shafts for respectively impressing said primary surface in the secondary surface and moving the latter's support, substantially as described.

10. In an apparatus of the character described, the combination of a primary surface, a support for a secondary surface, a pair of concentric hand-wheels, connections from said wheels for respectively impressing said primary surface in the secondary surface and moving the latter's support, and means for automatically returning the secondary surface to its normal position upon completion of the impression, substantially as described.

11. In an apparatus of the character described, the combination of a frame, a movable support for a secondary surface, a stop carried by said frame, slides on said frame, means for normally maintaining said slides in engagement with said stop, and lugs on said slides for engaging said movable support, substantially as described.

12. In an apparatus of the character described, the combination of a central fixed stop, slides, means for normally maintaining said slides in engagement with said stop, a carriage, and means carried by said slides for engaging said carriage to normally maintain the latter in central position, substantially as described.

13. In an apparatus of the character described, the combination of a central fixed stop, independently movable slides, resilient means for normally maintaining said slides in engagement with said stop, a carriage, and means carried by said slides for normally maintaining said carriage in central position, substantially as described.

14. In an apparatus of the character described, the combination of a central fixed stop, a carriage, independently movable slides engaging said carriage, adjustable faces on said slides, and resilient means for normally maintaining said slides with their adjustable faces in contact with said stop, substantially as described.

In testimony whereof I affix my signature in presence of two witnesses.

BURGESS W. SMITH.

Witnesses:
S. A. TERRY,
LOUIS A. HILL.

Copies of this patent may be obtained for five cents each, by addressing the "Commissioner of Patents, Washington, D. C."